(12) United States Patent
Dzuban et al.

(10) Patent No.: US 10,139,845 B2
(45) Date of Patent: Nov. 27, 2018

(54) SYSTEM AND METHOD FOR ENERGY CONSUMPTION MANAGEMENT IN BROADBAND TELECOMMUNICATIONS NETWORKS VIA ADAPTIVE POWER MANAGEMENT

(71) Applicant: Society of Cable Telecommunications Engineers, Inc., Exton, PA (US)

(72) Inventors: Mark Louis Dzuban, Elverson, PA (US); Daniel Harvey Howard, Atlanta, GA (US); Christopher Dale Bastian, Glenmoore, PA (US); Derek Ralph DiGiacomo, Boyertown, PA (US); Dean Alan Stoneback, Harleysville, PA (US); Thomas Martin Davidson, Highlands Ranch, CO (US); Niem Hoang Dang, Morrison, CO (US)

(73) Assignee: Society of Cable Telecommunications Engineers, Inc., Exton, PA (US)

( * ) Notice: Subject to any disclaimer, the term of this patent is extended or adjusted under 35 U.S.C. 154(b) by 321 days.

(21) Appl. No.: 15/010,952

(22) Filed: Jan. 29, 2016

(65) Prior Publication Data
US 2016/0224047 A1    Aug. 4, 2016

Related U.S. Application Data

(60) Provisional application No. 62/109,589, filed on Jan. 29, 2015.

(51) Int. Cl.
*G05B 23/02* (2006.01)
*G05F 1/66* (2006.01)

(52) U.S. Cl.
CPC ............ *G05F 1/66* (2013.01); *Y02B 70/3216* (2013.01); *Y02B 70/3233* (2013.01); *Y04S 40/10* (2013.01); *Y04S 40/12* (2013.01); *Y04S 40/16* (2013.01)

(58) Field of Classification Search
CPC .................................. Y04S 40/12; Y04S 40/16
(Continued)

(56) References Cited

U.S. PATENT DOCUMENTS

| | | | | |
|---|---|---|---|---|
| 6,633,823 B2 * | 10/2003 | Bartone | ................... | H02J 3/14 700/295 |
| 6,636,893 B1 * | 10/2003 | Fong | ..................... | G01R 22/00 370/252 |

(Continued)

OTHER PUBLICATIONS

Power-One web page (http://www.power-one.com/power/news/power-one-inc-announces-digita-o) as mentioned in application text, published prior to application filing.
(Continued)

*Primary Examiner* — Son Mai
(74) *Attorney, Agent, or Firm* — Flaster/Greenberg PC

(57) ABSTRACT

A system and method for the software and hardware-based management and control of overall energy consumption in a telecommunications network is described. The energy consumption management in broadband telecommunications networks is accomplished via an adaptive power system interface and network energy controller that has access to the energy management systems, subsystems, features, individual components and configurations of equipment and services within the network, and provides energy consumption control of an entire network or a portion thereof using a plethora of different types of equipment, equipment or software features, equipment cards, ports, devices, systems, and entire facilities within a network.

24 Claims, 8 Drawing Sheets

Overall Architecture Example

(58) Field of Classification Search
USPC .......................................................... 700/295
See application file for complete search history.

(56) References Cited

U.S. PATENT DOCUMENTS

| | | | | |
|---|---|---|---|---|
| 7,123,994 | B2* | 10/2006 | Weik .................... | G06Q 50/188 |
| | | | | 700/295 |
| 8,140,279 | B2* | 3/2012 | Subbloie ............... | G06Q 50/06 |
| | | | | 700/296 |
| 8,375,229 | B2* | 2/2013 | Saeki .................... | G06F 1/3203 |
| | | | | 713/300 |
| 8,548,607 | B1* | 10/2013 | Belz ....................... | G05B 15/02 |
| | | | | 700/11 |
| 8,793,029 | B2* | 7/2014 | Fausak ................... | G01D 4/002 |
| | | | | 700/276 |
| 2014/0164644 | A1* | 6/2014 | DeCusatis ............. | H04L 49/356 |
| | | | | 709/240 |

OTHER PUBLICATIONS

Ecodane system web page (http://www.euroview2011.com/fileadmin/content/euroview2011/abstracts/abstract_pries.pdf) as mentioned in application text, published prior to application filing.

* cited by examiner

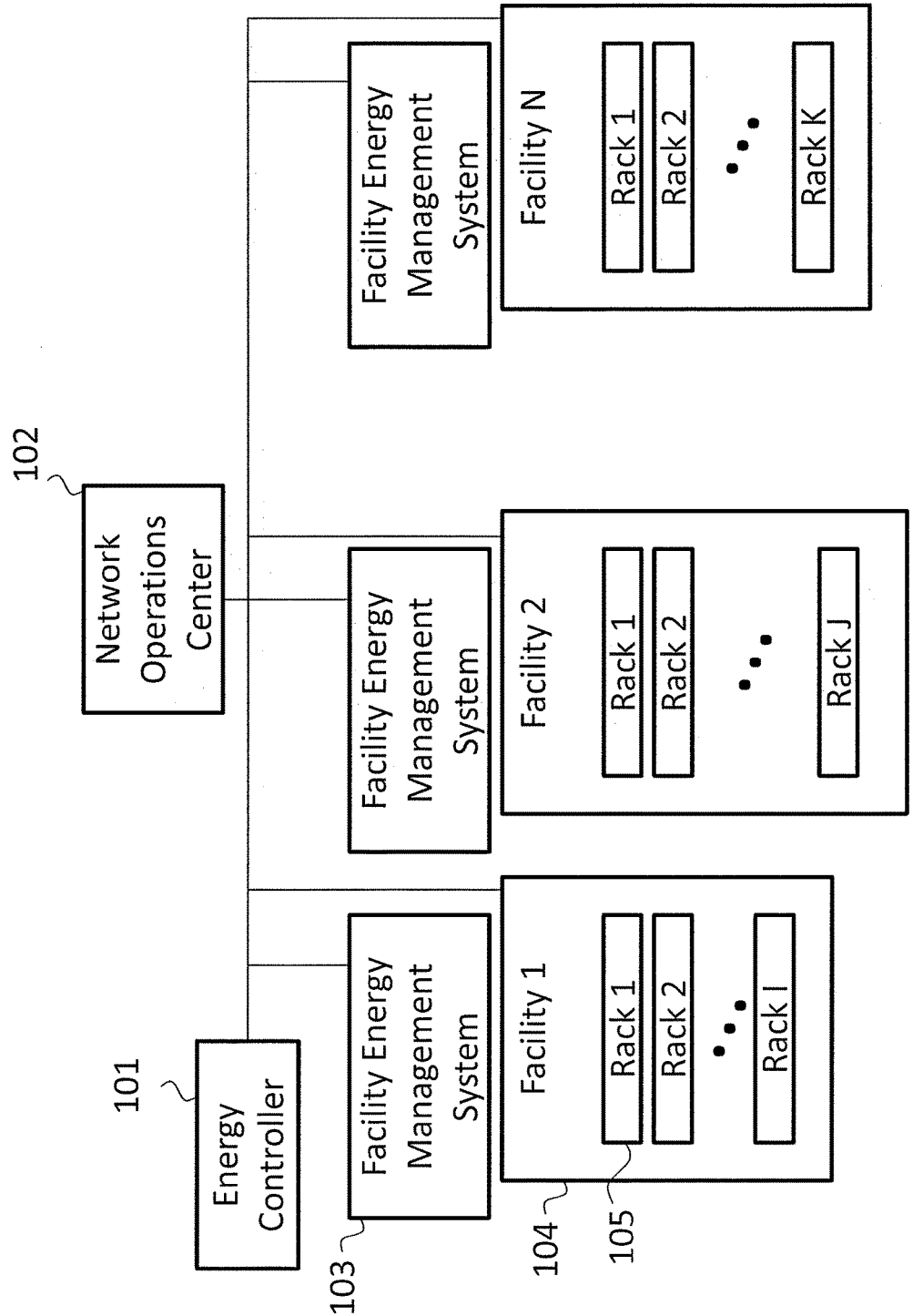
Fig 1. Overall Architecture Example

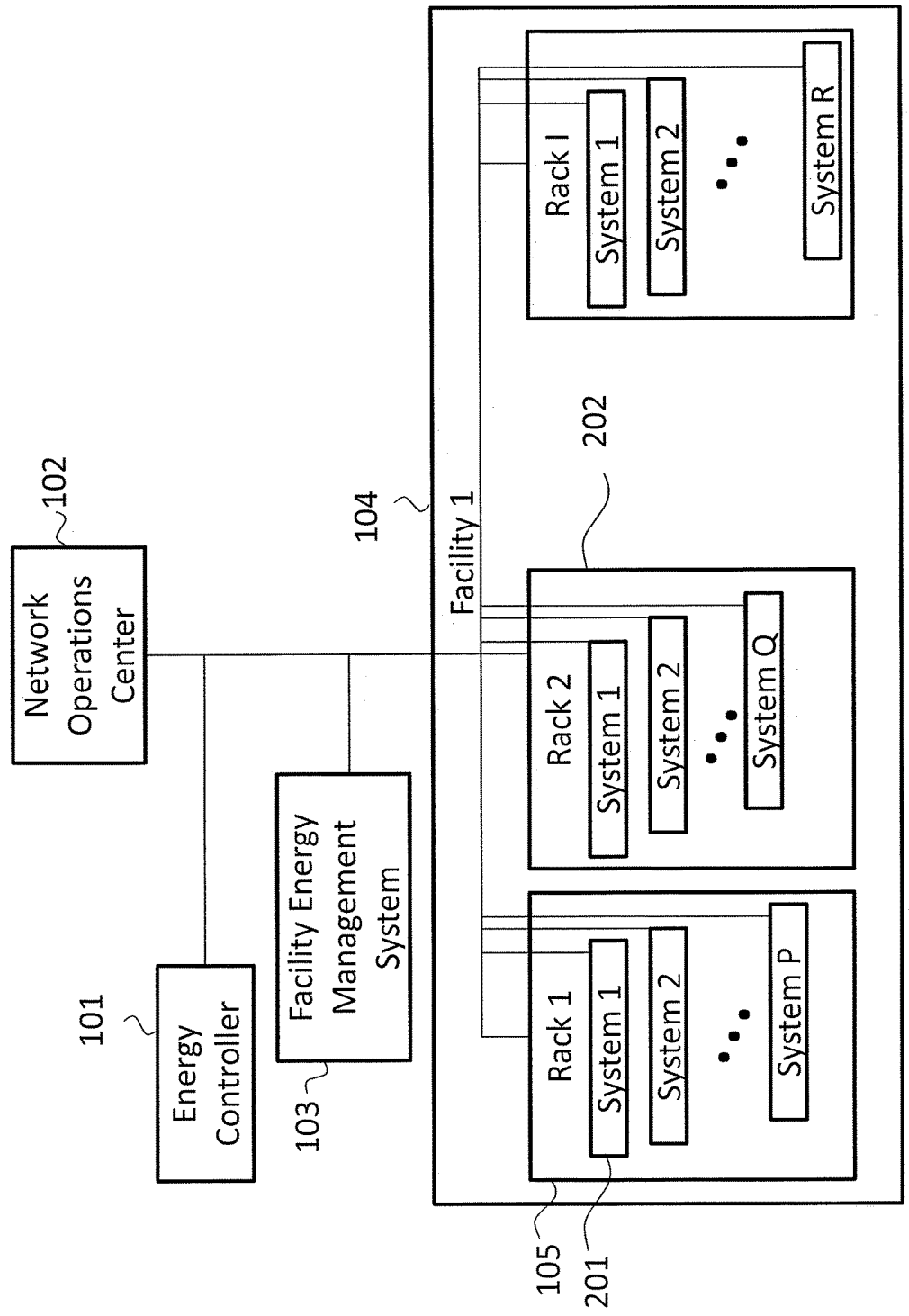
Fig 2. Example Facility Architecture

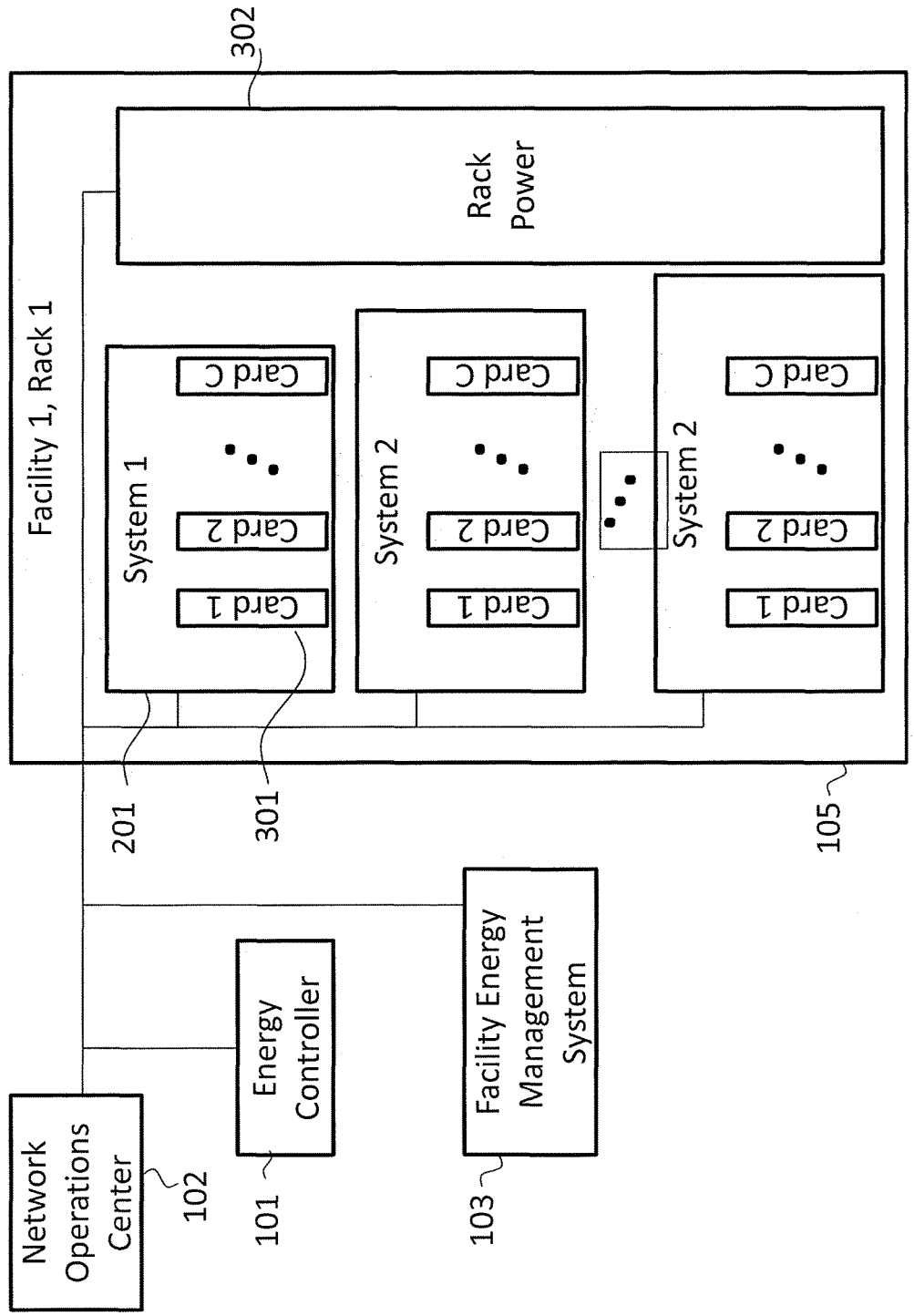
Fig 3. Example System Architecture

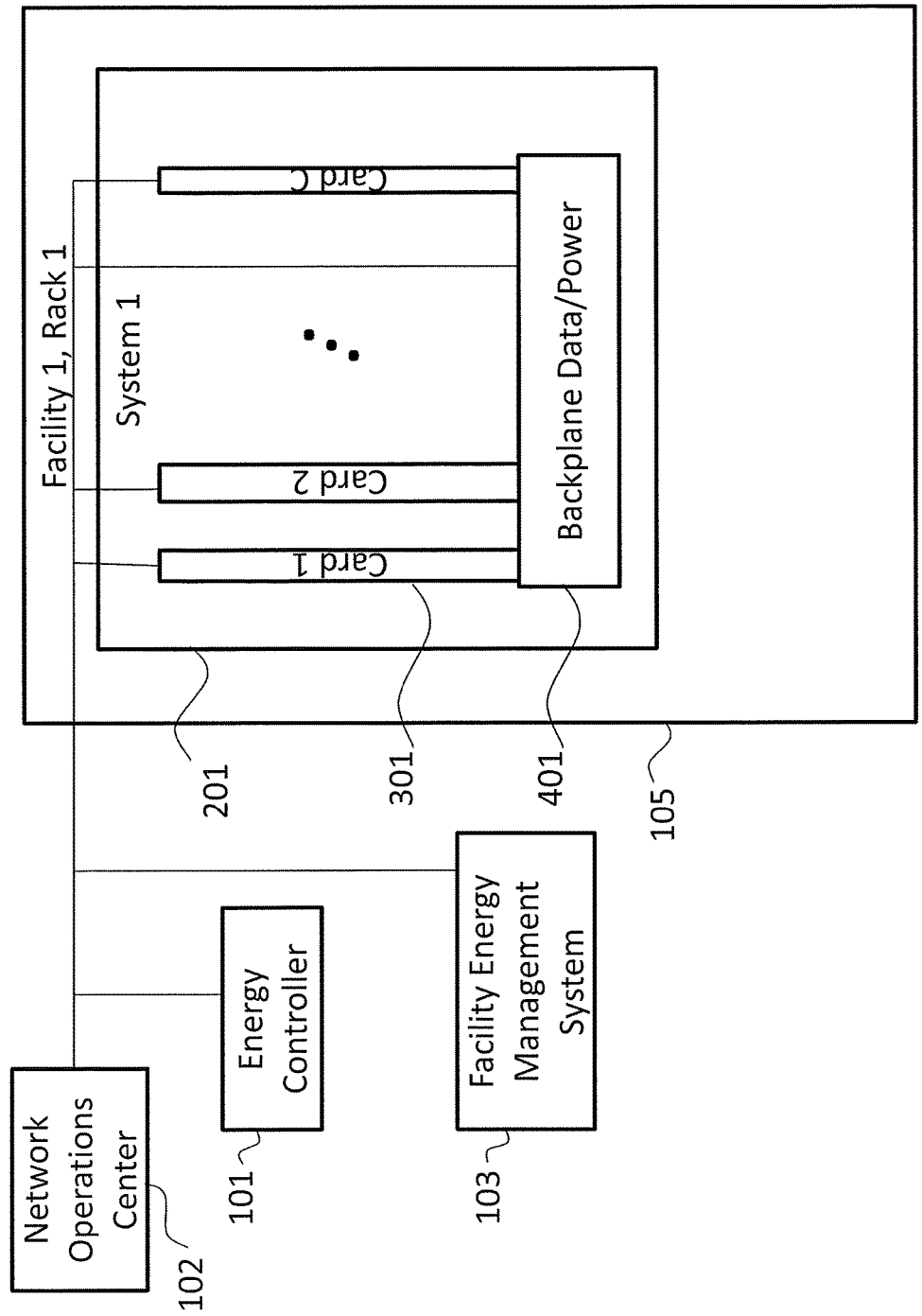
Fig 4. Example of Backplane Data/Power Control

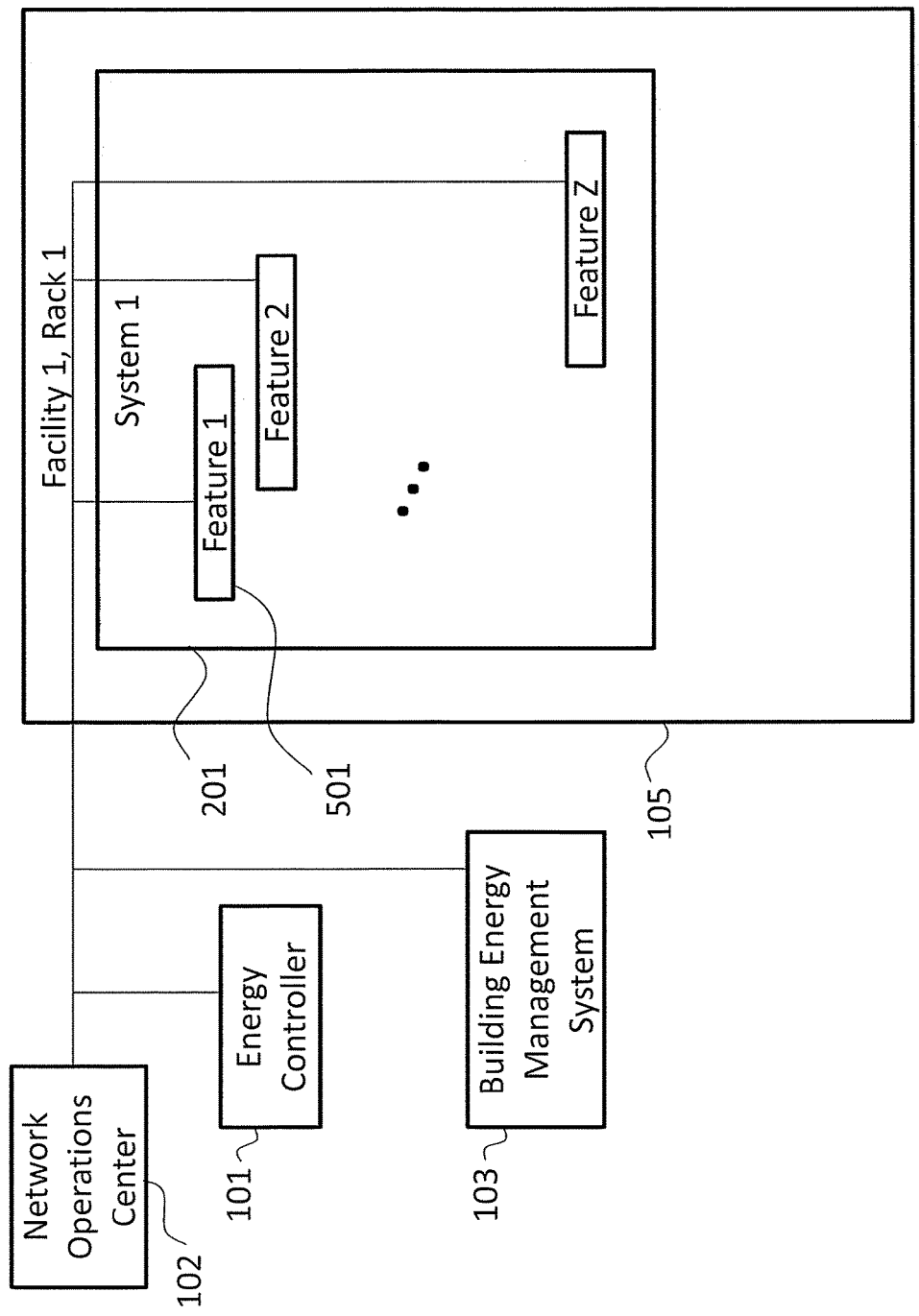
Fig 5. Example of Distributed Feature Control

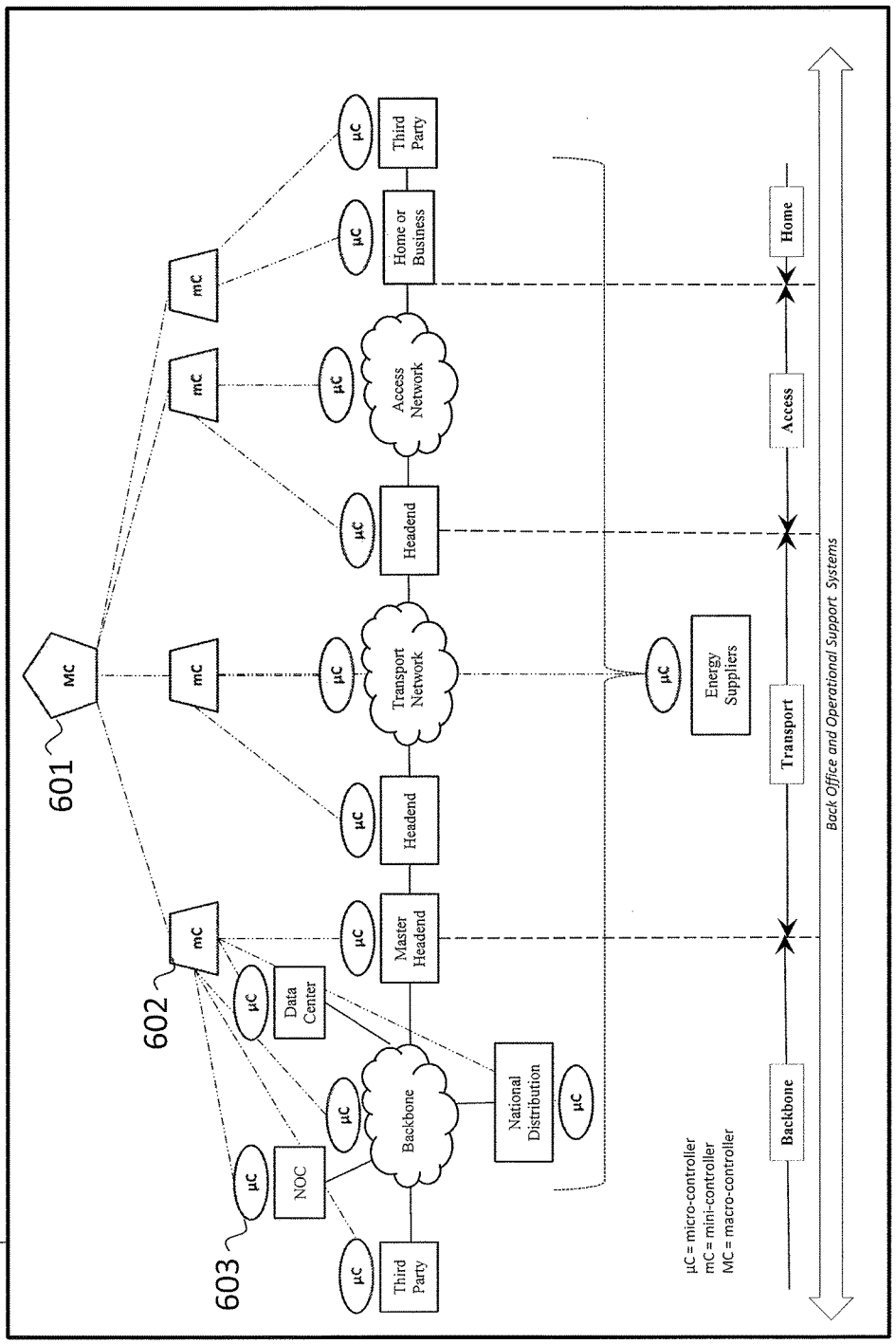
Fig 6. Example of Control Network Architecture

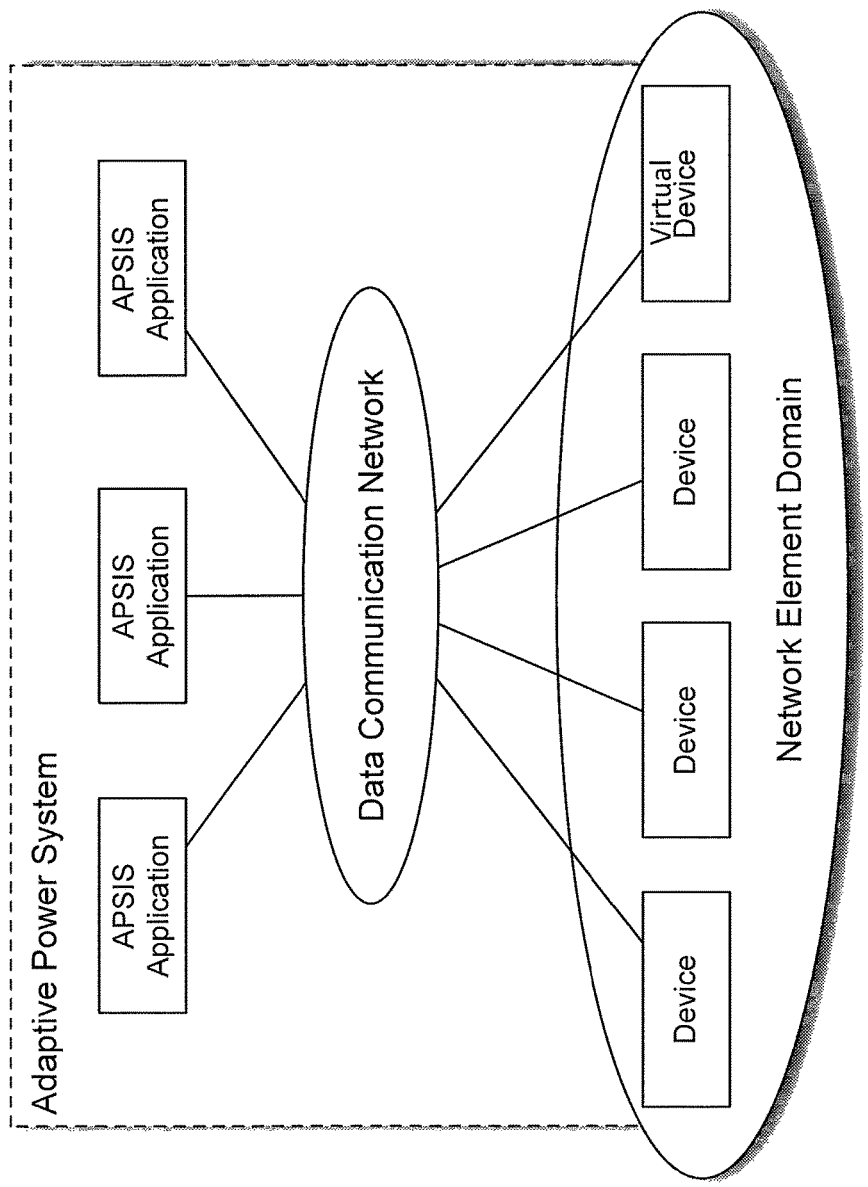
Fig 7. Example Communications Architecture

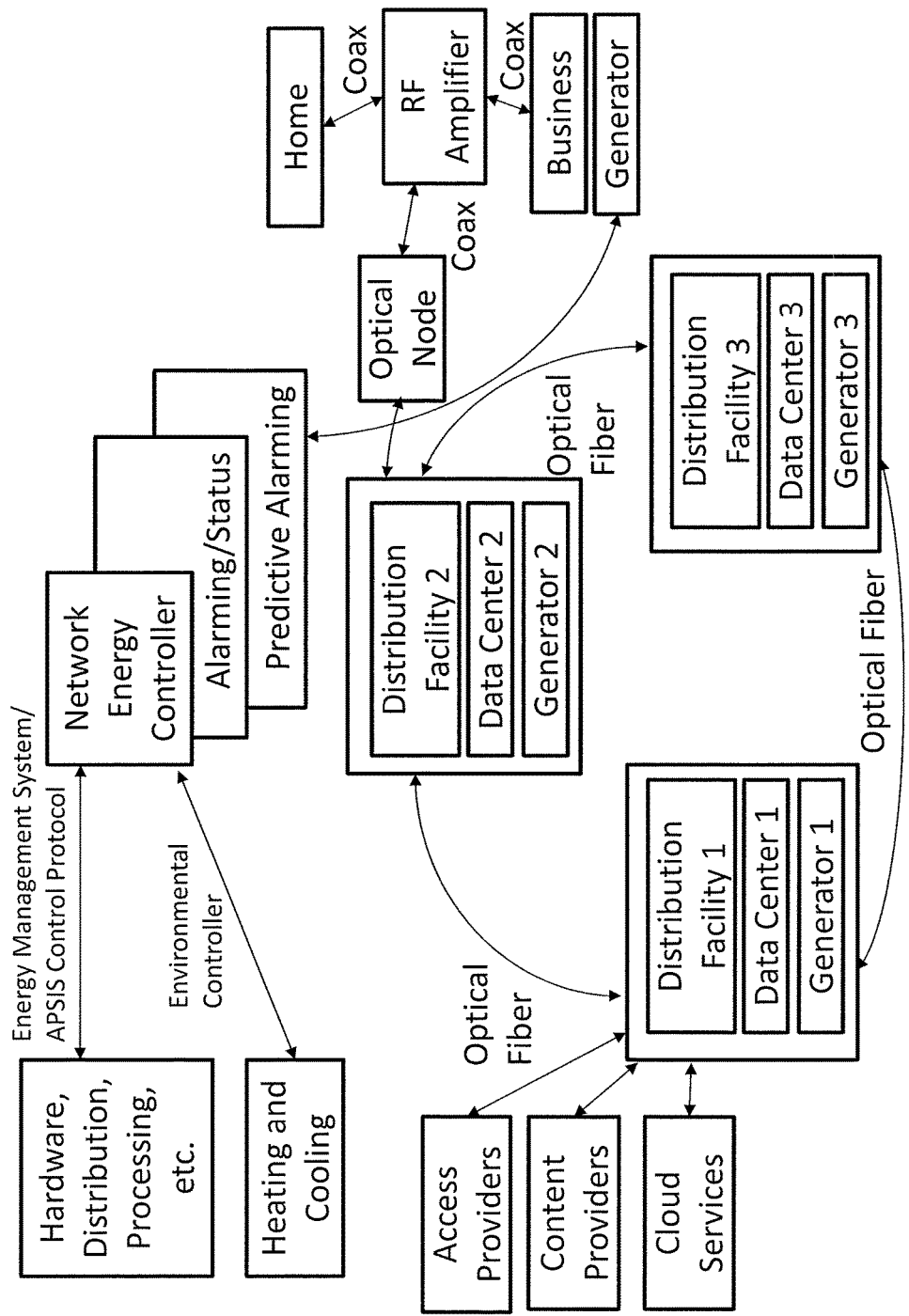

SYSTEM AND METHOD FOR ENERGY CONSUMPTION MANAGEMENT IN BROADBAND TELECOMMUNICATIONS NETWORKS VIA ADAPTIVE POWER MANAGEMENT

CROSS REFERENCE TO RELATED APPLICATION

The present application claims priority to and the benefit of the filing of U.S. Provisional Patent Application No. 62/109,589, filed Jan. 29, 2015.

BACKGROUND OF THE INVENTION

Field of the Invention

The present invention relates to energy consumption management, and more particularly, to a system and method for the software and hardware-based control of overall energy consumption in a telecommunications network.

Related Art

Building energy management systems (BEMS) have been deployed for some time. Most are concerned with heating ventilation and air-conditioning (HVAC) energy management via software and hardware-based control of HVAC equipment. For example, one system provides asset management of multiple remote facilities to control energy consumption and reduce costs associated with the operation and maintenance of core building systems (e.g. central plants, roof top units, lighting systems, refrigeration, etc.). Their diagnostics analyze the performance of these systems at both the facility-level and across an entire group of buildings and facilities, helping to identify potentially expensive problems before they result in a significant increase in energy consumption and makes it much easier to standardize equipment operation across a large portfolio of buildings. This approach is typically limited to HVAC type equipment and the comfort of occupants in the buildings, and does not address the energy consumption of telecommunications equipment and the associated critical facilities.

Power-One (http://www.power-one.com/power/news/power-one-inc-announces-digita-0) has patented the use of digital power technology via the PMBus open standard power-management protocol with a fully defined command language that facilitates communication with power converters and other devices in a power system. This standard allows for communication between devices based on both analog and digital technologies, and provides interoperability to reduce design complexity for power system designers. In particular, their solution applies to energy-efficient power conversion and power management solutions for alternative/renewable energy, routers, data storage and servers, wireless communications, optical networking, semiconductor test equipment, industrial markets and custom applications. This solution does not address the management of energy consumption via traffic engineering in telecommunications networks.

The ECODANE system is one of the first attempts to control energy consumption (http://www.euroview2011.com/fileadmin/content/euroview2011/abstracts/abstract_pries.pdf) via traffic engineering over a network of data centers. Importantly, this approach includes management of energy consumption via the intelligent shutting down, or placement into sleep mode of network switches, ports and links. However, this approach does not include energy management using knowledge of specific types of traffic with known qualities such as video and voice, nor does it cover telecommunications equipment other than traditional servers, routers, switches or ports.

In none of the above prior art does the approach cover the selective shutting down, slowing down, putting into sleep mode or otherwise reducing power consumption of specific cards, circuits, or features in telecommunications equipment based on traffic needs, nor on externally imposed energy limitations such as are required in disaster scenarios where energy is limited to that available from backup systems, nor on externally imposed energy limitations such as periods of peak demand to avoid brownouts or blackouts, nor to reduce energy consumption during periods of low demand, nor the need to manage energy consumption vs. traffic needs based on diurnally or seasonally variable energy costs, nor based on the energy cost across multiple suppliers.

What is needed is a method of managing energy consumption across an entire telecommunications network that spans both traditional HVAC needs as well as telecommunications traffic, and further includes the specifics of telecommunications equipment such as those found in modern broadband telecommunications networks such as video encoders, transcoders, statistical multiplexors, cable modem termination systems, radio frequency (RF) modulators, optical transmitters and receivers, and RF amplifiers, using a common control protocol and system interface specification that enables energy management via control of entire facilities all the way down to specific features on individual equipment in the network or components in the individual pieces of equipment.

BRIEF SUMMARY OF THE INVENTION

The present invention is directed to a method and system for energy consumption management in broadband telecommunications networks via adaptive power system management. In order to control energy consumption of an entire network that is composed of a plethora of different types of equipment, a system is required for adapting the energy consumption of features, cards, devices, systems, and entire facilities within a network including traditional HVAC, lighting and security needs of both people and equipment, and also the traffic delivery needs of the telecommunications network. In particular a controller that has access to the energy management systems, subsystems, features, and individual components of telecommunications, HVAC, lighting and security systems via an adaptive power system interface is described that permits adaptation of energy consumption in the entire network based on a variety of external and internal influences. External factors or influences are for example, but not limited to, those factors that can impact energy consumption and management such as weather forecasting, storm tracking, major events, rolling brown/black outs. Examples of internal factors or influences are, but not limited to, those factors that impact or provide status about network performance, outages, energy costs, past network performance trends, workforce availability, and proactive network maintenance data, parameters, and configurations.

The energy management controller system may be located at the master network operations control facility of a broadband telecommunications network, at an external facility, or may be distributed throughout the network. Additionally some or all of the functions of an energy management controller may be integrated into other equipment.

In one aspect of the present invention there is provided a system for controlling the energy consumption of a broadband telecommunications network based on a controller that has access to energy management features in many or all components in the network and is tied to some or all of the network operations control and building energy management systems that are aware of traffic needs and management capabilities throughout the broadband telecommunications network as well as HVAC, lighting and security needs within individual facilities.

In another aspect, there is a method where an adaptive power system interface is used on telecommunications equipment as well as HVAC, lighting and security equipment in order to control and manage energy consumption of the entire network and its facilities, equipment, parameters, and features.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

FIG. 1 shows an energy controller system within the overall architecture of a telecommunications network.

FIG. 2 shows an energy controller system operating with a facility energy management system for controlling a telecommunications network.

FIG. 3 shows an energy controller system operating in conjunction with a facility energy management system to control an individual system within a telecommunications network.

FIG. 4 shows an energy controller system operating in conjunction with a facility energy management system operating controlling the backplane data subsystem that provides power to each card within the system.

FIG. 5 shows an energy controller system having distributed feature control.

FIG. 6 shows an example of control network architecture for implementing an energy controller system for a broadband telecommunications network.

FIG. 7 shows a communications architecture having a number of layers for exchanging energy related information in an end-to-end telecommunications network.

FIG. 8 shows an end-to-end architecture for controlling energy consumption in multiple buildings of various sizes.

DETAILED DESCRIPTION

The present invention will be described with reference to the accompanying drawings. Like numerals and similarly named elements within the various drawings are intended to identify similar elements.

FIG. 1 illustrates the overall architecture of a system controlling energy consumption of a telecommunications network that coordinates traditional facility energy management system functionality with shut down, reduced power modes or sleep modes in facility telecommunications equipment in various locations in each facility. The terms "facility" and "building" are used here in a generic sense and can refer to a building or to any other asset owned or operated as part of the telecommunications network, including pedestals, pole mounted cabinets, outside aerial equipment or other types of assets. As illustrated, the energy controller 101 is a network appliance that accepts inputs such as external factors like weather forecasting, storm tracking, major events, rolling brown and/or black outs, as well as network operations status, especially energy consumption status, cost and goals, but also network outages and trends in network operations performance metrics, from the network operations center 102, and uses these input data to manage and control the various energy parameters, features, cards, racks, services, facilities, and overall network or sub-networks, and any other energy consumption impacting elements within the network, in order to control and optimize energy efficiency in the network. The network operation center 102 is a facility or group of facilities for managing network operations within a telecommunications network. The facility energy management system 103, which may also be identified as a building energy management system or building automation system, is a computer based system that monitors and controls the energy needs of a building by control and monitoring of the building mechanical and electrical equipment, such as ventilation, power, lighting, alarm (fire and security) systems. The facility energy management system 103 is typically comprised of both software and hardware. Facility 1, designated by numeral 104, is a building that houses telecommunications equipment. Facility 2 and Facility 3 are similar buildings or systems, examples of which are data centers, cacheing centers, administrative and network operations centers, regional network and administrative offices, headends, hubs, mini-hubs, and fleet operations centers. The facilities 104 are shown as including racks or similar storage enclosures 105 for servers, network appliances, telecommunications equipment and other equipment housed in telecommunications facilities. The energy controller 101 many have access to some or all of the components in each facility 104. The equipment may be in racks 105 as illustrated in the diagram or may be installed in an alternative fashion.

FIG. 2 shows the architecture of an adaptive power system that allows a centralized, remote, or distributed energy controller, in coordination with a facility energy management system 103 to control individual systems at locations in a facility 104 of a broadband telecommunications network. The types of facilities covered include, but are not limited to network operations centers, data centers, headends, and hubs. In FIG. 1, the energy controller 101 is shown connected to a series of facility energy management systems 103, with each system 103 associate with a separate facility 104. In FIG. 2, the facility 105 includes racks 105, 202 having a plurality of systems 201, such as a telecommunications appliance, group of appliances, or subset of a network appliance, including a card or group of cards that performs a given set of functions for the provision of network services, or the monitoring and control of those services.

FIG. 3 shows the architecture of an adaptive power system that allows a centralized, remote, or distributed energy controller, in coordination with a building energy management system to control individual systems 301 within system of appliances 201 in a facility of a broadband telecommunications network. The types of individual systems 301 covered include, but are not limited to encoders, transcoders, statistical multiplexing devices, servers for data, voice, audio and video content, routers, switches, ad splicers, encrypters, adaptive bit rate systems, cable modem termination systems, converged cable access platforms (CCAP), remote PHY, remote MAC/PHY, distributed CCAP, RF modulators, optical transmitters and receivers, and RF amplifiers. Remote PHY, also known as distributed PHY, refers to an architecture whereby the point at which digital signals are transformed into RF signals is moved from the cable headend to the fiber-optic node within the access network itself. Remote MAC/PHY is similar except that the media access control (MAC) functionality is also moved into the node. Both remote PHY and remote MAC/PHY are examples of the more general distributed CCAP architecture specification from CableLabs. The rack power 302 is a subsystem within a rack 105 that provides electrical power, either AC or DC, to the systems 201 or cards 301 contained within that rack 105.

FIG. 4 shows the architecture of an adaptive power system that allows a centralized, remote, or distributed energy controller 101, in coordination with a facility energy management system 103 to control individual cards or subsystems 301 within a system 201 in a facility 105 of a broadband telecommunications network via controlling the backplane power subsystem 401 that provides power to each card 301 within the system 201. The energy controller 101 can shut down individual cards 301 in a system 201 either directly via access to element management components within the system, or the individual cards, or via the backplane power supply 401 to each card 301. The illustrated backplane data/power supply 401 is contemplated to be any form of plane, such as front plane, side plane or bottom plane, and is generally an electrical interface for connecting cards to the system containing the plane.

FIG. 5 shows the architecture of an adaptive power system that allows a centralized, remote, or distributed energy controller 101, in coordination with a facility energy management system 103 to control individual features or parameters 501 within a system 201 in a facility 105 of a broadband telecommunications network. Each feature or parameter 501 is a distinctive attribute or aspect of a system or subsystem 201 that defines the overall function of the system or subsystem. There are both software and hardware features typically found in such systems and subsystems. The feature or parameter 105 may also be specified as part of a service, subset of a service, or group of services. The individual features or parameters 501 of the system 201 that impact energy consumption are controlled via element management of these features by the energy controller 101, and include, but are not limited to bit rate of data, voice, audio, and video communications, processor speed, and compression parameters, power supply parameters; dark/hot redundancy; Throttle functions/control Restoration time (nap, sleep, comatose mode of power-down).

FIG. 6 shows a control network architecture for implementing the energy controller function in a broadband telecommunications network, the communications of which are effected via a packet-switched network that interlinks the energy macro-, mini- and micro-controllers and the network elements and configurations. The energy controller function 101 is distributed throughout the broadband telecommunications network via an energy macro-controller 601, a plethora of energy mini-controllers 602 and a plethora of energy micro-controllers 603.

In the current example, the partitioning of the functions to the various controllers can be changed while maintaining the same functionality. The micro-controllers 603 are responsible for controlling individual elements of the network and reporting data such as, but not limited to total energy consumption over a specified interval of time, energy consumption variability, peak to average energy consumption ratio, peak energy consumption, energy availability, and cost of energy to the mini-controllers 602 and thence to the macro controller 601. The macro controller 601 uses data from monitored and analyzed energy consumption in the network in conjunction with telecommunications network data traffic loads, patterns, trends, constraints or growth plans, or any combination thereof to configure the broadband telecommunications network data transport subject to a plethora of energy constraints, and further uses an interface specification to monitor, analyze and control energy consumption in the network via communications protocols over a packet-switched network whereby equipment, systems, sub-systems, components, services and features in the network or any combination thereof can communicate energy consumption associated with specific equipment, systems, sub-systems, components, services, and features in the network or any combination thereof to the energy controller and permit adaptation by the any of the energy controllers 601, 602 and 603 of equipment, systems, sub-systems, components, services, and features in the network, or any combination thereof subject to a plethora of energy constraints.

The energy consumption of the network is controlled by the controllers 601, 602 and 603 using energy-saving features in the network elements such as power-off, disabling of selected features, or sleep modes or any combination thereof and employ these energy-saving features according to network data traffic loads. A typical example would be when data traffic loads are lower than the maximum capacity of the network and are expected to stay below the maximum capacity for a given period of time. Another example would be when the energy controllers 601, 602 and 603 adapt the central processing unit (CPU) load in network components based on a combination of traffic and energy requirements, a specific example of which would be when the CPU load in network elements is adapted to include the fact that the compression ratio of multimedia content is monotonically related to the CPU load of the cards, subsystems, or systems designed to encode, transcode, groom and transport such traffic. A further example would be when the radio frequency (RF) components in the network such as Quadrature Amplitude Modulators (QAMs) other types of RF modulators or other RF components such as amplifiers are configured such that the energy consumption of the network is reduced via the use of lower order modulation, alternate modulation schemes, alternate classes of RF amplifier operation such as Class C or Class B vs. Class A operation, and modulation schemes that provide lower energy consumption at the cost of reduced network traffic capacity. Additionally, optical components such as lasers and receivers may have their bias currents and other operational parameters adjusted to reduce energy consumption.

FIG. 7 shows a communications architecture that is comprised of an applications layer, a communications layer and a device layer that enable the exchange of energy related information and the capability to issue energy related commands to control energy in an end-to-end telecommunications network. The device layer is composed of physical devices and each device will implement at least one communications protocol. The communications layer may be composed of any number of various protocols, e.g. HTTP, IPDR, SNMP, NETCONF, etc. The application layer could house adapters and/or controllers that are developed to interface with the communications layer. The controllers are applications that exert control over an individual or groups of devices or sections of a network. The controllers could also implement service provider policies. Controllers might access the devices directly via a device supported protocol or indirectly through adapters, e.g. a RESTful HTTP interface to some other protocol.

FIG. 8 shows an end-to-end architecture illustrating that the facilities and elements being controlled can be in buildings of various size and location as well as pedestals, pole mounted cabinets, outside aerial equipment or other types of assets. The elements being controlled may include generators and other energy sources in addition to the communications equipment. In the outside plant, optical nodes and RF amplifiers may be controlled to reduce energy. For instance, bias currents or voltages may be reduced and gains or levels may be changed based on traffic, energy or other requirements of the network. The control system may also reach out to customer premises equipment to regulate energy usage of the equipment at the premise, control primary or backup power systems such as generators, and/or control the types of services being transported to, from, or within the premise.

As was explained in FIG. 8, radio frequency (RF) components in the network such as Quadrature Amplitude Modulators (QAMs) other types of RF modulators or other RF components such as amplifiers are configured such that the energy consumption of the network is reduced via the use of lower order modulation, alternate modulation schemes, alternate classes of RF amplifier operation such as Class C or Class B vs. Class A operation, and modulation schemes that provide lower energy consumption at the cost of reduced network traffic capacity. Additionally, optical components such as lasers and receivers may have their bias currents and other operational parameters adjusted to reduce energy consumption. These power reduction modes can be implemented in any portion of the network described in FIG. 8.

A further implementation of energy saving in the RF network can be to eliminate RF carriers that are not necessary. By consolidating traffic onto a reduced number of RF carriers, the unused carriers can be turned off. This not only saves energy at the RF modulator, but it also enables the cascading effect of energy savings at every point in the network that carries said RF carriers, such as lasers, optical receivers and RF amplifiers. If the quantity of RF carriers is reduced, the bias current of said RF equipment may also be reduced while maintaining sufficient fidelity. Even more energy can be saved by careful selection of the RF carriers to be turned off, since the fidelity requirements for each RF carrier are often not identical. For example, in hybrid fiber coax (HFC) networks, the RF levels out of the amplifiers in the coaxial portion of the network have increased power versus frequency. The higher frequency RF carriers are amplified to higher levels so that they can traverse the higher loss of the coaxial cable at those frequencies. Turning off high frequency carriers will reduce the total RF power by a greater amount than turning off the same number of low frequency carriers and allow a greater reduction in bias current and, thus, energy savings, than turning off low frequency carriers.

Another method to reduce energy in the portion of the network that carries RF carriers is to select type of modulation based not only on how much information that modulation can carry, but also by the amount of energy that is needed to transport those RF carriers with adequate fidelity. For instance, carriers that are modulated with a high order of modulation (high number of bits per symbol) require a high carrier to noise for adequate fidelity. In general, high bias current and, thus, more energy is required to maintain high carrier to noise. However, carriers with a high order of modulation also carry more information. It might be advantageous to use a higher quantity of RF carriers with a low order of modulation than fewer RF carriers with a high order of modulation, especially if all the required carriers can be carried at lower frequencies. An energy controller could calculate the bias currents required for various quantities, modulation types and frequencies of RF carriers, select the combination with the lowest energy consumption and then implement that solution across the various components in the network by generating the proper carriers at the proper frequencies and controlling the bias current in the various RF devices appropriately.

While various embodiments of the present invention have been described above, it should be understood that they have been presented by way of example only, and not limitation.

What is claimed is:

1. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network; and
   d. wherein the network energy controller uses a packet-switched network that interlinks one or more controllers, wherein the controllers are energy macro-, mini- and micro-controllers, and the network energy controller function is distributed throughout the network via an energy macro-controller, a plurality of energy mini-controllers and a plurality of energy micro-controllers.

2. The system of claim 1 wherein the equipment comprises equipment cards, devices, software features, applications, systems, or entire facilities or ecosystems within the network, wherein the equipment is controllable via access to the energy management systems, subsystems, features, individual components and configurations of the equipment within the network.

3. The system of claim 1 wherein the adaptive power system effects control of energy consumption in the network based on a plurality of external and internal influences, wherein the influences comprise weather forecasting, storm tracking, major events of high energy usage, rolling brown outs, rolling black outs, real-time network data, outages in other sections of the network, network energy costs, past network performance or any combination thereof.

4. The system of claim 1 wherein energy consumption controlled by the network energy controller is based on information from facility elements, wherein the facility elements are heating, ventilation, and air conditioning (HVAC), lighting, security for people and equipment or the dynamic traffic delivery needs of the network.

5. The system of claim 1 wherein the location of the network energy controller is in a master network operations control facility within the network, in an external facility, distributed throughout the network, or hierarchically controlling other systems of network energy controllers distributed throughout the network.

6. The system of claim 1 wherein at least a portion of the functions of the network energy controller are integrated into elements within the equipment.

7. The system of claim 1 wherein the adaptive power system controls the energy consumption of the network by coordinating facility energy management system functionality with functionality of the equipment within the network, wherein the equipment functionality is a shut down mode, a reduced power mode, a sleep mode, or any mode combination thereof.

8. The system of claim 1 wherein the adaptive power system is implemented via a centralized, remote, or distributed energy controller, in coordination with a facility energy management system to control individual systems based on the integration of energy management status and information from elements within the equipment in the network.

9. The system of claim 1 wherein the network energy controller adapts the energy consumption via controlling elements, wherein the elements are encoders, transcoders, multiplexing devices, servers for data, voice, audio and video content, routers, switches, ad splicers, decrypters, encrypters, adaptive bit rate systems, cable modem termination systems (CMTS), converged cable access platforms (CCAP), edge quadrature amplitude modulators (edge QAM) remote PHY, remote MAC/PHY, distributed CCAP, radio frequency (RF) modulators, optical transmitters, optical receivers, radio frequency (RF) amplifiers or any combination thereof within the equipment within the network.

10. The system of claim 1 wherein the network energy controller adapts the energy consumption via controlling a power subsystem element that provides power to a plurality of subsystems within the equipment and can shut down an individual subsystem within the plurality either directly via access to an element management component, wherein the element management component is an onboard or off-board system, an individual subsystems, or a control of the power supply to the subsystem, wherein the plurality of subsystems are cards, midplanes, backplanes, other busses and subsystems or combinations thereof.

11. The system of claim 1 wherein the network energy controller controls parameters of the equipment of the network that impact energy consumption via element management, wherein the parameters are bit rate of data, voice, audio, and video communications, processor speed, compression parameters, power supply parameters, dark/hot redundancy, and throttle functions/control restoration time, and wherein the throttle functions/control restoration time are modes for nap, sleep, comatose mode of power-down or any combination thereof.

12. The system of claim 1 wherein the total energy consumption in the network is controlled by monitoring energy consumption metrics, wherein the energy consumption metrics are the energy consumption over a specified interval of time, energy consumption variability, peak to average energy consumption ratio, peak energy consumption, energy availability, cost of energy or any combination thereof.

13. The system of claim 12 wherein the network energy controller uses the energy consumption metrics in conjunction with network data traffic loads, patterns, trends, constraints, growth plans or any combination thereof to configure the network data transport subject to a plurality of energy constraints.

14. The system of claim 1 wherein the network energy controller uses a set of protocols to monitor, analyze and control energy consumption in equipment within the network, wherein the equipment is systems, sub-systems, components, services and features in the network or any combination thereof and wherein the equipment communicates energy consumption associated therewith to the network energy controller and wherein control by the energy controller of the equipment is subject to a plurality of energy constraints.

15. The system of claim 12 wherein the network energy controller uses external data as input to an algorithm resulting in energy control of network elements, wherein the external data comprises weather forecasting, storm tracking, major events of high energy usage, rolling brown outs, rolling black outs, real-time network data, outages in other sections of the network, network energy costs, past network performance or any combination thereof.

16. The system of claim 12 wherein the network energy controller uses energy-saving features within in the network elements based on network data traffic loads, wherein the energy-saving features are power-off, disabling of selected features, or sleep modes or any combination thereof.

17. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network;
   d. wherein the total energy consumption in the network is controlled by monitoring energy consumption metrics,
   e. wherein the energy consumption metrics are the energy consumption over a specified interval of time, energy consumption variability, peak to average energy consumption ratio, peak energy consumption, energy availability, cost of energy or any combination thereof;
   f. wherein the network energy controller uses energy-saving features within in the network elements based on network data traffic loads,
   g. wherein the energy-saving features are power-off, disabling of selected features, or sleep modes or any combination thereof; and
   h. wherein the network energy controller further implements the energy-saving features according to changing video quality requirements versus network capacity availability and network energy power availability.

18. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network;
   d. wherein radio frequency (RF) components in the network have their bias currents, bias voltages, gain levels or any combination thereof adjusted to reduce energy consumption, and
   e. wherein the radio frequency (RF) components are Quadrature Amplitude Modulators (QAMs), RF modulators, RF amplifiers, optical transmitters, optical receivers or any combination thereof.

19. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network;
   d. wherein radio frequency (RF) components in the network are configured such that the energy consumption of the network is reduced via the use of lower order modulation, alternate modulation schemes, alternate modulation profiles or any combination thereof.

20. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network;
   d. wherein radio frequency (RF) components in the network are configured such that the energy consumption in the network is reduced via the use of an alternate class or classes of RF amplifier operation.

21. The system of claim 1 further comprising an application layer that houses interface elements, wherein the interface elements are adapters or controllers that are developed to interface with a communications layer and the controllers, and wherein the interface elements comprise applications that exert control over an individual or groups of devices or sections of the network according to an energy policy in combination with service provider policies.

22. The system of claim 1 wherein the network energy controller communicates with customer premises equipment using a set of interfaces for the adaptive power system, wherein the interface comprises specifications to regulate energy usage of system equipment at premise, controls for primary or backup power systems, generators, controls for services being transported to, from, or within the premise or any combination thereof.

23. A system for energy consumption management in a telecommunications network via adaptive power system management, the system comprising:
   a. a network or a portion thereof that is composed of a plurality of different types of equipment;
   b. an adaptive power system for controlling the energy consumption of a plurality of elements within the equipment within the network;
   c. a network energy controller within the adaptive power system that uses a set of protocols to control the energy consumption of the plurality of elements within the network;
   d. wherein the total energy consumption in the network is controlled by monitoring energy consumption metrics,
   e. wherein the energy consumption metrics are the energy consumption over a specified interval of time, energy consumption variability, peak to average energy consumption ratio, peak energy consumption, energy availability, cost of energy or any combination thereof;
   f. wherein the network energy controller uses energy-saving features within in the network elements based on network data traffic loads,
   g. wherein the energy-saving features are power-off, disabling of selected features, or sleep modes or any combination thereof; and
   h. wherein the network energy controller affects radio frequency (RF) components in the network and implements energy saving by at least temporarily muting or eliminating radio frequency (RF) carriers that are not necessary based on traffic needs within the network and by adjusting bias current or bias voltage of radio frequency (RF) amplifiers in proportion to network needs.

24. The system of claim 22 further comprises a set of customer interfaces and wherein a customer accesses the system through the interface to regulate customer premise equipment within the network.

* * * * *